(12) United States Patent
Putnam

(10) Patent No.: US 8,566,857 B2
(45) Date of Patent: Oct. 22, 2013

(54) METHOD, SYSTEM AND PROGRAM PRODUCT FOR BROADCAST ADVERTISING AND OTHER BROADCAST CONTENT PERFORMANCE VERIFICATION UTILIZING DIGITAL ARTIFACTS

(75) Inventor: Jon S. Putnam, Goodyear, AZ (US)

(73) Assignee: Forefront Assets Limited Liability Company, Wilmington, DE (US)

( * ) Notice: Subject to any disclaimer, the term of this patent is extended or adjusted under 35 U.S.C. 154(b) by 961 days.

(21) Appl. No.: 11/533,748

(22) Filed: Sep. 20, 2006
(Under 37 CFR 1.47)

(65) Prior Publication Data
US 2007/0220544 A1  Sep. 20, 2007

Related U.S. Application Data

(60) Provisional application No. 60/718,847, filed on Sep. 20, 2005.

(51) Int. Cl.
*H04H 20/12* (2008.01)

(52) U.S. Cl.
USPC .......................................................... 725/22

(58) Field of Classification Search
USPC .......................................................... 725/22
See application file for complete search history.

(56) References Cited

U.S. PATENT DOCUMENTS

| | | |
|---|---|---|
| 4,025,851 A | 5/1977 | Haselwood et al. |
| 4,457,804 A | 7/1984 | Reinhall |
| 4,497,060 A | 1/1985 | Yang |

(Continued)

FOREIGN PATENT DOCUMENTS

| | | |
|---|---|---|
| EP | 0 859 503 A3 | 2/1997 |
| EP | 0 899 688 A2 | 3/1999 |

(Continued)

OTHER PUBLICATIONS

Putnam, Method, System and Program Product for the Insertion and Retrieval of Identifying Artifacts in Transmitted Lossy and Lossless Data, PCT Notification of Transmittal of the International Search Report and the Written Opinion of the International Searching Authority, or the Declaration, Aug. 7, 2007, PCT/US06/36663, CeloData, Inc.

(Continued)

*Primary Examiner* — Nicholas Corbo
(74) *Attorney, Agent, or Firm* — Christensen O'Connor Johnson Kindness PLLC

(57) ABSTRACT

A verification system that injects a inaudible identification code into a broadcast advertisement immediately prior to its radio frequency transmission is disclosed. An amplitude modulated sample sequence called a "digital artifact" containing, for example, a date and time code, is generated and inserted into the audio or video or composite audio and video data stream called a content "carrier." The combined data signal is converted from a digital stream to an analog signal and processed by standard broadcast transmission and transmitted in the radio frequency spectrum in the conventional manner. A radio frequency spectrum radio or television receiver receives the broadcast signal and converts to a digital data stream. A decoder processes the transmitted content carrier and extracts the digital artifact from the data stream. The derived information is evaluated, quantified, and transmitted to a central control point where it is compared with original reference and identification data.

30 Claims, 7 Drawing Sheets

(56) References Cited

U.S. PATENT DOCUMENTS

| | | | |
|---|---|---|---|
| 4,639,779 A | 1/1987 | Greenburg | |
| 4,805,020 A | 2/1989 | Greenburg | |
| 4,876,617 A | 10/1989 | Best et al. | |
| 5,019,899 A | 5/1991 | Boles et al. | |
| 5,113,437 A | 5/1992 | Best et al. | |
| 5,128,933 A | 7/1992 | Baranoff-Rossine | |
| 5,319,735 A | 6/1994 | Preuss et al. | |
| 5,379,345 A | 1/1995 | Greenberg | |
| 5,450,122 A | 9/1995 | Keene | |
| 5,450,490 A | 9/1995 | Jensen et al. | |
| 5,600,573 A | 2/1997 | Hendricks et al. | |
| 5,613,004 A | 3/1997 | Cooperman et al. | |
| 5,636,292 A | 6/1997 | Rhoads | |
| 5,659,350 A | 8/1997 | Hendricks et al. | |
| 5,663,766 A | 9/1997 | Sizer, II | |
| 5,687,236 A | 11/1997 | Moskowitz et al. | |
| 5,737,025 A | 4/1998 | Dougherty et al. | |
| 5,828,270 A | 10/1998 | Chang | |
| 5,850,481 A | 12/1998 | Rhoads | |
| 5,872,588 A * | 2/1999 | Aras et al. | 725/14 |
| 5,889,868 A | 3/1999 | Moskowitz et al. | |
| 5,905,800 A | 5/1999 | Moskowitz et al. | |
| 5,940,135 A | 8/1999 | Petrovic et al. | |
| 6,026,193 A | 2/2000 | Rhoads | |
| 6,035,177 A * | 3/2000 | Moses et al. | 725/22 |
| 6,047,374 A | 4/2000 | Barton | |
| 6,101,604 A | 8/2000 | Barton | |
| 6,163,842 A | 12/2000 | Barton | |
| 6,205,249 B1 | 3/2001 | Moskowitz | |
| 6,216,228 B1 | 4/2001 | Chapman et al. | |
| 6,285,774 B1 | 9/2001 | Schumann et al. | |
| 6,604,224 B1 * | 8/2003 | Armstrong et al. | 714/819 |
| 6,625,295 B1 | 9/2003 | Wolfgang et al. | |
| 6,718,551 B1 * | 4/2004 | Swix et al. | 725/32 |
| 6,721,437 B1 | 4/2004 | Ezaki et al. | |
| 6,769,127 B1 | 7/2004 | Bonomi et al. | |
| 7,039,931 B2 * | 5/2006 | Whymark | 725/32 |
| 7,124,442 B2 | 10/2006 | Nash-Putnam | |
| 2002/0076043 A1 | 6/2002 | Van Der Vleuten et al. | |
| 2002/0083442 A1 * | 6/2002 | Eldering | 725/34 |
| 2002/0178445 A1 * | 11/2002 | Eldering et al. | 725/32 |
| 2004/0015400 A1 * | 1/2004 | Whymark | 705/14 |
| 2004/0025176 A1 | 2/2004 | Franklin et al. | |
| 2005/0028189 A1 * | 2/2005 | Heine et al. | 725/20 |
| 2005/0166237 A1 | 7/2005 | Kawakami | |

FOREIGN PATENT DOCUMENTS

| | | |
|---|---|---|
| EP | 1 031 944 A1 | 8/2000 |
| EP | 1 063 833 A2 | 12/2000 |
| EP | 1 075 108 A1 | 2/2001 |
| EP | 1 079 627 A1 | 2/2001 |
| WO | WO 00/25203 | 5/2000 |
| WO | WO 00/54453 | 9/2000 |
| WO | WO/01/22652 A2 | 3/2001 |
| WO | WO 01/45316 A1 | 6/2001 |
| WO | WO 01/45410 A2 | 6/2001 |

OTHER PUBLICATIONS

Zeng, Fan-Gang, Interactions of Forward Masking and Simultaneous Masking in Intensity Discrimination. Journal of Acoustic Society of America, 1998, vol. 103, pp. 2021-2030.

Wehr, Michael and Zador, A.M., Synaptic Mechanisms of Forward Suppression in Rat Auditory Cortex, Neuron, 2005, vol. 47, pp. 473-445.

Meddis, Ray and O'Mard, L.P., Computer Model of the Auditory-Nerve Response to Forward Masking Stimuli, Journal of Acoustic Society America, 2005, vol. 117, pp. 3788-3798.

Langemann, U. and G.M. Klump, Signal Detection in Amplitude-Modulated Maskers, European Journal of Neuroscience, 2001, vol. 13, pp. 1025-1032.

Jones, E.G., Viewpoint: The core and Matrix of Thalamic Organization, Neuroscience, 1998 vol. 85, pp. 331-345.

Heinz, Michael G., Colburn, H.S., and Carney, L.H., Quantifying the Implications of Non-linear Tuning for Auditory-Filter Estimates. Journal of Acoustic Society of America, 2002, vol. 111, pp. 978-990.

Gockel, Hedwig, et al. Louder Sounds Can Produce Less Forward Masking: Effects of Component Phase in Complex Tones, Journal of Acoustic Society of America, 2003 vol. 114, pp. 114,978-990.

Denham, Susan L., A Model of Temporal Response Properties in Primary Auditory Cortex, 2001.

Malangone, Carmine—Office Action dated Jan. 26, 2009; U.S. Appl. No. 11/533,760.

Corbo, Nicholas T.—Office Action dated Dec. 4, 2008; U.S. Appl. No. 11/533,754.

Corbo, Nicholas T.—Office Action dated Sep. 15, 2009; U.S. Appl. No. 11/533,754.

* cited by examiner

METHOD, SYSTEM AND PROGRAM PRODUCT FOR BROADCAST ADVERTISING AND OTHER BROADCAST CONTENT PERFORMANCE VERIFICATION UTILIZING DIGITAL ARTIFACTS

PRIORITY CLAIM

The application claims the benefit of priority under 35 U.S.C. §119(e) from U.S. Provisional Application No. 60/718,847, entitled, "A System and Method for Broadcast Advertising and Other Broadcast Content Performance Verification Utilizing Digital Artifacts," filed on Sep. 20, 2005, which is incorporated herein by reference in its entirety.

CROSS-REFERENCE TO RELATED APPLICATIONS

The present application is related to the following co-pending U.S. patent applications filed on even date herewith, owned by the assignee hereof, and which are hereby incorporated herein by reference in their entirety:

U.S. Pat. No. 7,668,205, entitled "Method, System and Program Product for the Insertion and Retrieval of Identifying Artifacts in Transmitted Lossy and Lossless Data."

application Ser. No. 11/533,754, entitled "Method, System and Program Product for Broadcast Error Protection of Content Elements Utilizing Digital Artifacts."

application Ser. No. 11/533,760, entitled "Method, System and Program Product for Broadcast Operations Utilizing Internet Protocol and Digital Artifacts."

BACKGROUND

It is desirable to verify the performance by radio and television broadcasters of advertisements. Advertisers purchasing broadcast time from radio and television stations are contractually obligated to pay for this time only if the advertisement was broadcast in accordance with the agreed terms and conditions. Generally these terms include a description of the advertisement to be broadcast, the time period in which it is to be broadcast, and certain obligations to replay the advertisement if parameters agreed to by the broadcaster and the purchaser of the broadcast time are not met by the broadcaster. The contractual compliance of performance from radio and television broadcasters previously has been attested to by sworn affidavits.

The current state of the art accomplishes independent verification primarily through human observation. Observers listen or watch for the advertisement and note the time and broadcasting radio or television station in a log record. Technical methods have also been employed. These require previous processing of the advertisement by pre-processing insertion of an identification code or digital watermark into the commercial material.

Principal among the technological techniques for marking broadcast content for performance verification are (1) insertion of a digital watermark into the video waveform or the audible portion of the transmitted audio spectrum, (2) insertion of data in under-utilized portions of the video waveform such as scan lines above or below the viewable area of the interleaved video frame, (3) insertion of data as sub-audible or super-audible tones or combinations of tones in the transmitted audio spectrum, or (4) insertion of identification codes as data utilizing either the frequency or phase domains.

All of these technical methods are nonintrusive. The techniques generally require the creation of a compressed representation, signature or digital fingerprint prior to the distribution of the radio or television commercial advertisement. The results of the broadcast performance on either radio or television of the previously compressed content can be matched by the application of an identical data compression technique at the time the broadcast commercial is received.

Digital watermarks are effective in applications such as digital rights management for compact discs (CDs) and digital video discs (DVDs) where the attribution of the watermarked content is permanently identified with a single source such as a studio, publisher or performing artist, and multiple copies of the content are to be distributed. The digital watermark fails in efficacy where the identification, verification or authentication must be attributed to multiple sources such as the purchasers of broadcast radio or television advertising time that are not associated with the producer of the digital watermarked advertising content distributed to the broadcaster.

Digital watermarking systems for audio content such as U.S. Pat. No. 5,940,135 to Petrovic et al. (1999) generally employ techniques that in some way manipulate the content in either the phase, time or frequency domains, or any number of permutations of the three. These approaches are readily apparent to the accomplished and discerning listener. They appear to the accomplished listener as audible degradations of the audio content either as blurred edges to crisp, high frequency sonic colorations, as phase "pumping" or wavering in all frequencies whose coloration should appear steady to the discerning human ear.

Other identification systems known to the art rely on the insertion of digital data into the typically unseen scan lines that appear in the broadcast video frame above or below the normal viewing area of the television picture. These in-line insertion methods such as U.S. Pat. No. 4,025,851 to Hazelwood et al. (1977), U.S. Pat. Nos. 4,457,804; 4,639,779; 4,805,020 to Greenberg (1985-1989), U.S. Pat. No. 5,450,122 to Keane et al. (1995) generally use video scan line 20 as the location for the insertion of binary identification codes. These approaches are, like digital watermarks, generally effective when applied to network or other single source originations where there exists a one-to-one relationship between the television advertising content and the owner of the commercial or the advertising agency that originated the contract, or as is known in the broadcast industry as an "Insertion Order" that purchased the advertising time. These methodologies fail where the television commercial is broadly disseminated for use by purchasers of local or network advertising time other than the originator or its representative advertising agency.

Other systems have combined modulated data with the audio or video channel of the program segment using frequency shift keyed modulation (FSK) such as U.S. Pat. No. 5,128,933 Baranoff-Rossine (1992) or U.S. Pat. No. 5,663,766 Sizer, II (1997). Some of these systems have notched out sections of the audio channel within the range of human hearing and FSK-encoded data using audible frequencies with amplitudes that are substantially inaudible to the typical listener.

In one system known to the art, a subaudible (below the nominal frequency range of human hearing) frequency band was chosen to encode the identification data and on-off keying of a fixed modulation frequency was used to designate the binary data content. Such a system is believed to have an undesirable amount of noise susceptibility, because it is not possible to differentiate between the absence of a modulation frequency and an off-keyed modulation state.

Other identification methods known to the art use frequency spread spectrum techniques to periodically insert time-stamp and identification information into master audio recordings for the purpose of recovering this time and identification data for performance verification. U.S. Pat. No. 5,379,345 to Greenberg (1995) is one such example. This approach, like digital watermarking, while effective in identifying mass copies of advertising content, fails in efficacy where the encoded identification points to an individual or entity other than the purchaser of the radio or television broadcast advertising time seeking proof of performance.

A further problem with audio applications of the frequency spread spectrum method is that, in the absence of audio data carrier components to mask the code frequencies, they can become audible. This method, therefore, relies on the asserted noise-like character of the codes to suggest that their presence will be ignored by listeners. However, in the case of an accomplished listener this assumption may not be valid, for example, in the case of recorded music containing passages with relatively little audio carrier content or during pauses in speech.

Other forms of identification and verification rely on signatures, digital fingerprinting or other related pattern recognition techniques such as those described in U.S. Pat. Nos. 4,230,990 and 4,677,466 to Lert, Jr. et al. (1980, 1987) and U.S. Pat. No. 4,450,531 to Kenyon et al. (1984). These approaches require prior knowledge of the audio or video subject-matter content, which are not available in real-time. Also such comparison techniques are of only limited reliability due to normal degradation of the signal due to airborne broadcast transmission, such as electromagnetic interference, multi-path transmission errors, and a number of other environmental disturbances. These forms of pattern comparison of a portion of an audio or video content can be utilized for identification purposes, but the comparison requires significant analysis and has a high probability of inaccuracy.

Although systems such as those described above are typically sufficient for the particular and initial purposes for which they were designed, they suffer certain deficiencies inherent to their ubiquitous use for broadcast verification. Encoding methods and compressed identification techniques generally adopted in the broadcast industry fail to accurately attribute broadcast advertisements to the purchasers of the commercial time when the purchaser is not the originator of the encoding or the fingerprinting of the advertisement when it was created.

SUMMARY

In accordance with the present disclosure, methods, systems and program products for a verification system that injects a human invisible and inaudible identification code into a broadcast advertisement immediately prior to its radio frequency transmission are disclosed. Such identification could include but is not limited to a unique identification code for the advertisement, an identification code for the broadcast station, and a date and time code to establish the date and time of transmission.

In an illustrated embodiment of the present disclosure, an amplitude modulated sample sequence called a "digital artifact" containing, for example, a number identifying a broadcast content originator, a code unique to the content to be transmitted, and a number identifying the station, cable system, or individual destination, is generated by a conventional computer and input to an encoder of the communications system of the illustrated embodiment. The "digital artifact" is inserted into the audio or video or composite audio and video data stream called a content "carrier." The combined data signal is converted from a digital stream to an analog signal and processed by standard broadcast transmission and transmitted in the radio frequency spectrum in the conventional manner.

A conventional radio frequency spectrum radio or television receiver contained in the interface device of the illustrated embodiment receives the broadcast signal. The received analog signal is converted from an analog signal to a digital data stream and is processed by a decoder that processes the transmitted content carrier and extracts the digital artifact from the data stream. The derived information is evaluated, quantified, and transmitted to a central control point via conventional data communication methods where it is compared with the original reference and identification data.

All objects, features, and advantages of the present disclosure will become apparent in the following detailed written description.

BRIEF DESCRIPTION OF THE DRAWINGS

In the following detailed description of representative embodiments of the disclosure, reference is made to the accompanying drawings, which form a part hereof, and in which is shown by way of illustration specific representative embodiments in which the disclosure may be practiced, as follows.

In the accompanying drawings, in which like numbers represent the same or similar elements and one or a plurality of such elements, features might not be to scale and may be shown in generalized or schematic form or may be identified solely by name or other commercial designation.

DETAILED DESCRIPTION

In the following detailed description of representative embodiments of the disclosure, specific representative embodiments in which the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined only by the appended claims. In particular, although one embodiment is described below with primary respect to a radio broadcast system, it will be appreciated that the present disclosure is not limited to such implementations, and may be implemented in radio, television, Internet, cellular, Wi-Fi, Wi-MAX, satellite, local area network, wide area network, a public switched telephone network, a wireless network, fiber-optic network, microwave transmission link and other broadcast systems.

Figure 1:
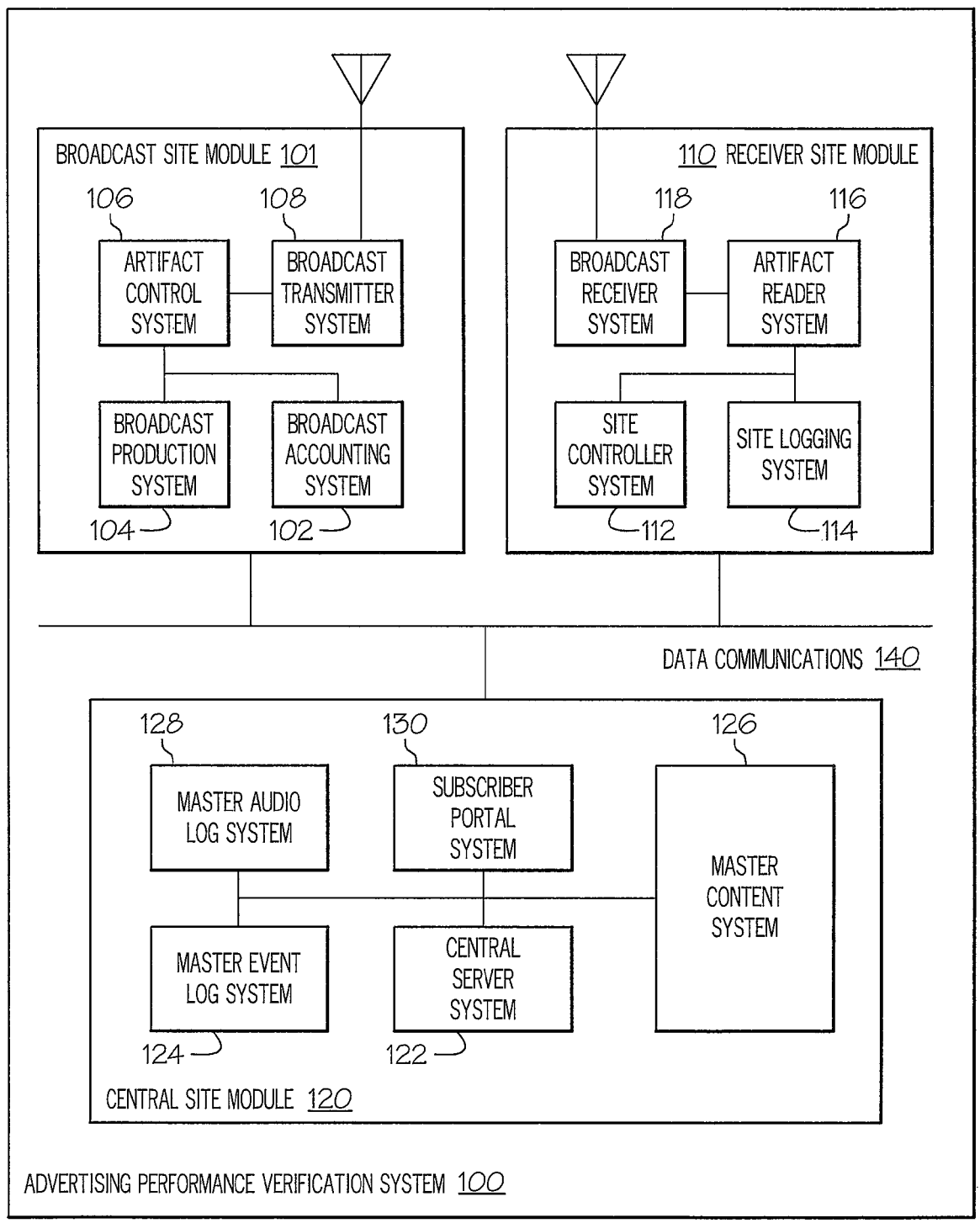
FIG. 1 is a diagram of a system for the verification of performance for broadcast events modulated with identifying artifacts in accordance with a representative embodiment of the present disclosure.

FIG. 1 is a diagram of a system 100 for the verification of performance of commercial advertising and broadcast program events modulated with identifying artifacts in accordance with a representative embodiment of the present disclosure. System 100 performs real-time, automated insertion of identifying artifacts within transmitted broadcast content and verifies the reception of the identifying artifacts in the broadcast content, so as to allow the verification of the broadcast performance of the commercial advertisement or other broadcast program content.

System 100 includes broadcast site module 101, which can be implemented in hardware, software, or a suitable combination of hardware and software, and which can be one or more software systems operating on a general purpose server platform. As used herein, a software system can include one or more objects, agents, threads, subroutines, separate software applications, two or more lines of code or other suitable software structures operating in two or more separate software applications, on two or more different processors, or other suitable software architectures. In one representative embodiment, a software system can include one or more lines of code or other suitable software structures operating in a general purpose software application, such as an operating system, and one or more lines of code or other suitable software structures operating in a specific purpose software application. In another representative embodiment, a software system can be one or more lines of hypertext markup language (HTML), extensible markup language (XML), a web browser plug-in, or other suitable code that operates in conjunction with a web browser application.

Broadcast site module 101 is coupled to receiver site module 110, and central site module 120 via data communications medium 140. As used herein, the term "couple," and its cognate terms such as "couples" and "coupled," can include a physical connection (such as through one or more copper conductors), a virtual connection (such as one or more randomly assigned data memory locations of a data memory device), a logical connection (such as through one or more logical devices of a semiconducting circuit), a wireless connection, a hypertext transfer protocol (HTTP) connection, radio frequency broadcast transmission, or other suitable connections, or a suitable combination of such connections. In one representative embodiment, systems and components can be coupled to other systems and components through intervening systems and components, such as through an operating system of a general purpose server platform. Further, broadcast site module 101 transmits radio or television broadcasts to receiver site module 110 electromagnetically in the radio frequency spectrum.

Communications medium 140 can be the Internet, a local area network, a wide area network, the public switched telephone network, a wireless network, fiber-optic network, microwave transmission link, or other suitable communications media, or a suitable combination of such communications media.

In an illustrated embodiment of the present disclosure, the system 100 is comprised of three modules located in three separate and independent locations. broadcast site module 101 is located within the control facilities of a radio or television broadcast station or a radio or television network. Receiver site module 110 is centrally located but at a distance such that it can receive the transmitted radio frequency signal of multiple broadcast stations. Central site module 120 is centrally located geographically to be interconnected to a number of broadcast site and receiver site modules through the use of data communication medium 140.

Figure 2:
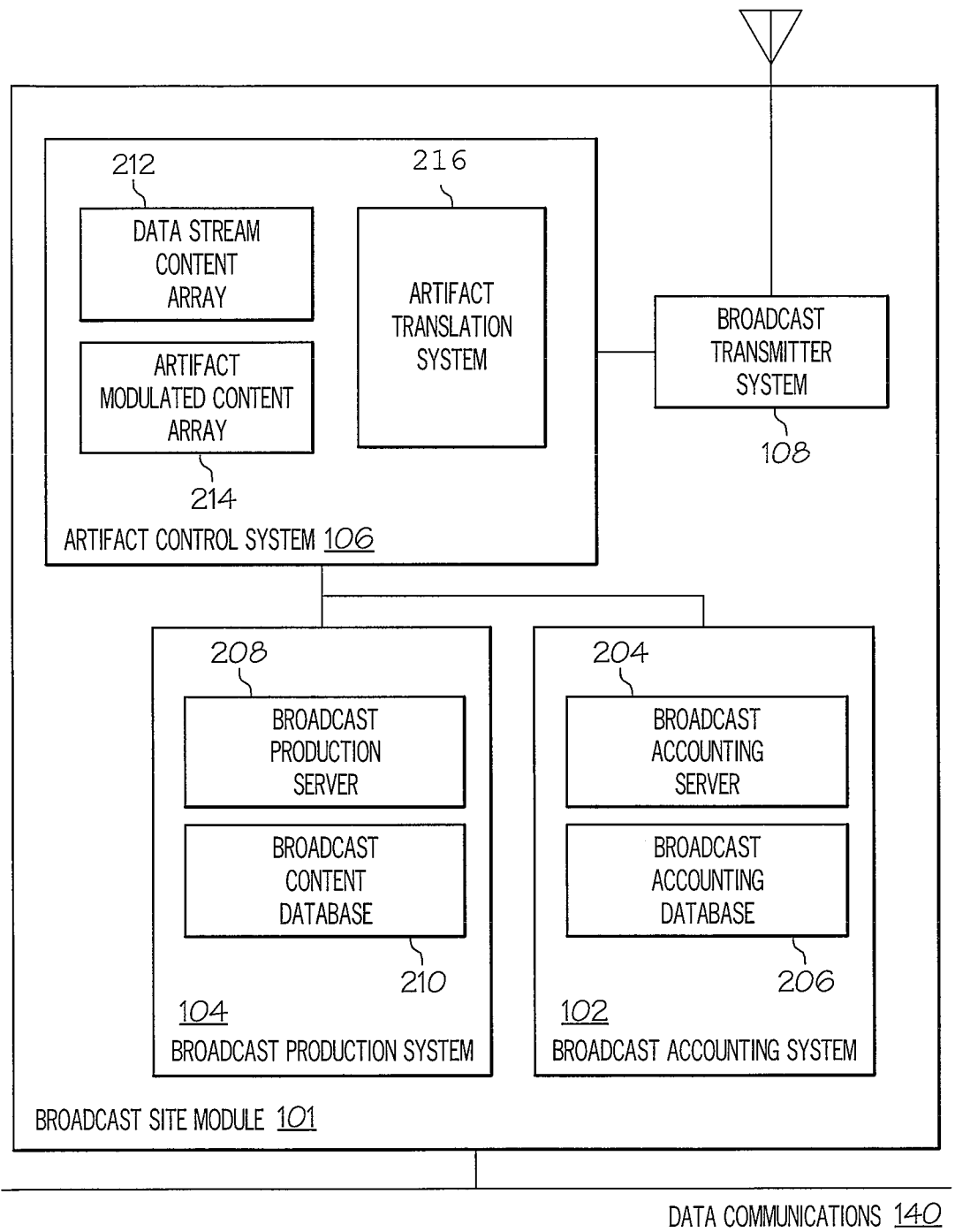
FIG. 2 is a diagram of a broadcast site module of a system for the verification of performance of broadcast advertising events modulated with identifying artifacts in accordance with a representative embodiment of the present disclosure.

FIG. 2 is a diagram of a broadcast site module 101 for preparing and inserting identifying artifacts into broadcast radio or television data streams in accordance with a representative embodiment of the present disclosure. Broadcast site module 101 includes broadcast accounting system 102, broadcast production system 104, artifact control system 106, each of which can be implemented in hardware, software, or suitable combination of hardware and software, and which can be one or more software systems operating on a general purposes processing platform, and broadcast transmitter system 108.

Broadcast accounting system 102 comprises broadcast accounting server 204 and broadcast accounting database 206 with key elements of that database that include, but are not limited to, advertiser records, advertising schedules, program day-parts that bound the time periods for advertising scheduling, etc.

Broadcast production system 104 comprises broadcast production server 208 and broadcast content database 210 with key elements of that database that include but are not limited to, program segments, music selections, program announcements, public service announcements, and advertising commercials.

Artifact control system 106 comprises artifact translation system 210, data stream content array 212 and artifact modulated content array 214. In a representative embodiment of the present disclosure this system receives a digital audio data stream from broadcast production system 104 and information about the broadcast event from both broadcast production system 104 and broadcast accounting system 102 and a time code from the system clock. The time, information, and digital audio stream are translated by artifact translation system 210 into a digital audio stream modulated periodically by an identifying artifact.

Broadcast site module 101 is coupled with central site module 120 by data communications medium 140. Data communications medium 140 can be the Internet, a local area network, a wide area network, the public switched telephone network, a wireless network, fiber-optic network, microwave transmission link, or other suitable communications media, or a suitable combination of such communications media.

In one representative embodiment, broadcast advertisements are ordered by advertisers through the use of a purchase contract called an "Insertion Order." This document instructs the radio or television network or broadcast station to broadcast the advertisements either at a specific date and time or within a set of date and time, or day and time parameters, e.g., Monday to Friday and 6:00 AM to 10:00 AM. Broadcast accounting system 102, known within the industry as a "traffic" system is utilized to record the order and track its performance during the period of the order, known within the industry as a commercial "flight."

In a representative embodiment of the present disclosure, for verified radio station broadcast operations, artifact control system 106 is interconnected with the broadcast accounting system 102, the broadcast production system 104 and the broadcast transmitter system 108. Insertion requests are received either as hard-copy or electronically through data communications medium 140 and are entered into the Insertion Order segment of the broadcast accounting database 206 by the broadcast accounting server 204. The artifact control system 106 assigns a unique identifier to each advertisement, known within the industry as a "commercial" or "spot." Periodically, these unique identifiers are transmitted to central master advertiser database 412.

Commercial or spot content is received by the broadcaster either as a digital audio file transmitted through the Internet or a data communications network 140 or in physical form as a compact disc (CD) or digital audio tape (DAT). These spots are loaded by the broadcast production system 104 into the broadcast content database 210. Artifact control system 106 assigns a unique identifier that corresponds to the unique identifier in the Insertion Order segment in the broadcast accounting database 206 to the spot's digital audio file and injects that commercial identifier into the spot's digital audio file stored in the broadcast content database 210.

Periodically, the broadcast accounting system 102 generates a set of instructions called a "traffic log." These instructions are transmitted to broadcast production system 104 through a data communications network. Broadcast production system 104 interleaves the traffic log instructions for advertisement placement into a set of internal instructions called a "production log," which includes instructions to perform other forms of program content and music selections.

The process for broadcasting operation utilizing identifying artifacts begins when broadcast production server 208 reads each command in the broadcast event sequence contained in broadcast content database 210. This broadcast event sequence is a synthesis of the broadcast log instruction set from broadcast accounting system 102 and internal instructions regarding music or other program content located in broadcast production system 104. Each event in the event log is selected and placed in a queue in preparation for broadcast. Queued spot audio files are accessed by the artifact control system 106 which reads the file and extracts the digital artifact version of the spot's commercial identifier. This identifier is compared with the commercial identifier contained in the event log instructions.

If the commercial identifiers from the spot's digital audio file and event log instruction record do not match, the spot's digital audio file is rejected for broadcast and broadcast accounting system is alerted to correct the discrepancy and to reschedule the spot's broadcast. If the commercial identifiers from the spot's digital audio file and Event Log instruction record match, the spot's digital audio file is verified and released for broadcast.

Broadcast production system 104 merges each program digital audio file or spot digital audio file into the broadcast data stream in accordance with the instructions contained in each record of the event log. The data stream is routed from broadcast production system 104 to artifact control system 106. Artifact control system 106 retrieves the unique event identifier from the broadcast event log and, in the case of advertisements, compares the identifier with the commercial identifier stored in the Insertion Order segment of broadcast accounting database 206. Artifact control system 106 associates this event identifier with a unique event digital artifact root of appropriate bit length and concatenates this with a time code of appropriate length that denotes the time of insertion of the digital artifact into the data stream. The resulting composite data stream is routed to broadcast transmitter system 108 for distribution. Broadcast transmitter 108, in the case of AM and FM radio, passes the data stream through an digital-to-analog converter (DAC) where the digital audio stream is converted into an analog audio signal and transmitted into the open air electromagnetically in the radio frequency spectrum.

Figure 3:
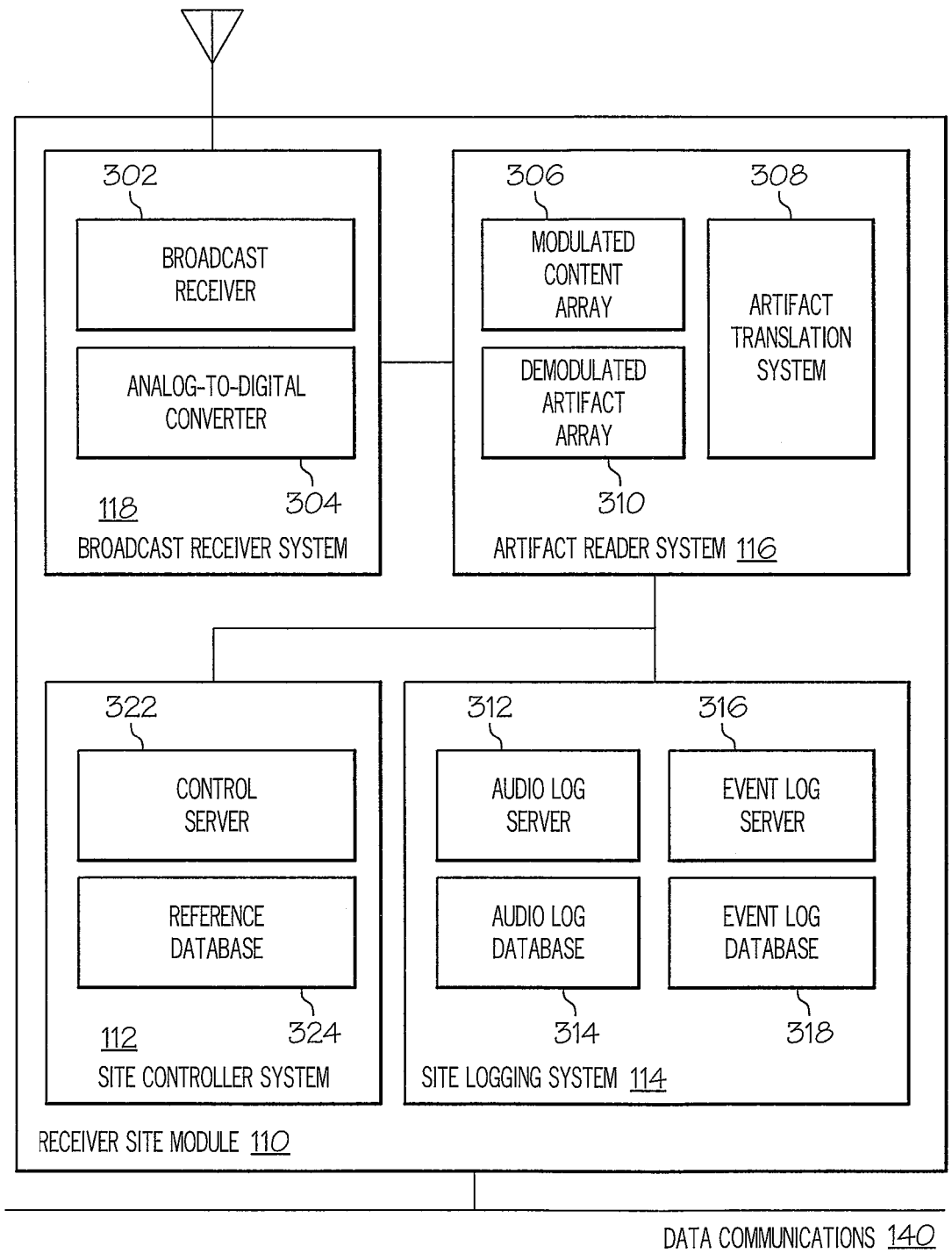
FIG. 3 is a diagram of a receiver site module of a system for the verification of performance of broadcast advertising events modulated with identifying artifacts in accordance with an a representative embodiment of the present disclosure.

FIG. 3 is a diagram of a system 110 for retrieving and aggregating identifying artifacts from broadcast radio or television data streams in accordance with an exemplary embodiment of the present invention. System 110 includes site controller system 112, site logging system 114, artifact reader system 116, each of which can be implemented in hardware, software, or a suitable combination of hardware and software, and which can be one or more software systems operating on a general purpose server platform, and broadcast receiver system 118.

Broadcast receiver system 118 comprises broadcast receiver 302 and analog-to-digital converter 304. Artifact reader system 116 comprises artifact translation system 308, modulated content array 306 and demodulated artifact array 310. Site logging system 114 comprises audio log server 312 and its associated audio log database 314 and event log server 316 and its associated event log database 318. Site controller system 112 comprises control server 322 and its associated reference database 324.

In an exemplary embodiment of the present invention this system receives a digitized audio data stream from broadcast receiver system 118. The audio data samples are inserted into modulated content array 306 and translated by artifact translation system 308 into identifying artifact samples which are stored in demodulated artifact array 310. Site logging system 114 comprises audio log server 312 and audio log database 314 with key elements of that database that include but are not limited to, event station, event date, event time, event signature, which is an accurate compression of the event into a short binary numeric string, and event audio which is a moderately compressed representation of the actual audio broadcast.

Receiver site module 110 is coupled with central site module 120 by data communications medium 140. Data communications medium 140 can be the Internet, a local area network, a wide area network, the public switched telephone network, a wireless network, fiber-optic network, microwave transmission link, or other suitable communications media, or a suitable combination of such communications media.

In a preferred embodiment of the present invention, radio frequency signals comprised of either frequency or amplitude modulated audio signals, or frequency modulated composite video and audio signals, or both audio and composite video and audio signals are received by broadcast receiver 302. Broadcast receiver 302 detects the processed analog signal containing the identifying artifact broadcast by the broadcast transmitter 108 and routes it to the analog-to-digital converter 304 for digitizing if the signal is analog. The received analog signals or broadcast modulated digital data streams are tested for modality and the analog signals are converted into a digital data stream of samples by analog-to-digital converter 304.

Artifact reader system 116 locates the identifying digital artifact in the broadcast data stream, extracts the digital artifact and decodes the event information from the digitized, transmitted broadcast event. Artifact reader system scans the broadcast data stream in search of modulated identifying artifacts. When an artifact location is found artifact translation system 308 demodulates the artifact sample from the data stream and continues until the last artifact sample in that location is demodulated. The assembled artifact is interpreted for its identification content and is forwarded with a date, time and station identifying header to site logging system 114. The demodulated audio data stream is also forwarded to site logging system 114 with an attached date, time, and station record.

Event log server 316 of site logging system 114 receives the identification artifact with its attached date, time, and station header and inserts it into event log database 318. Audio log server 312 of site logging system 114 receives the demodulated audio data stream with attached date, time, and station record and inserts it into audio log database 314.

Periodically, site controller system 112 upon command from the central site module 120 will instruct event log server 316 to access event log database 318 and forward all records in the data base to central site module 120 via data communications medium 140. In a like manner, site controller system 112 will instruct audio log server 312 to access audio log database 314 and forward all records in the database to central site module 120 via data communications medium 140. Site controller system 112 will, from time to time receive updates of reference database 324 from central site module 120 via data communications medium 140.

Figure 4:
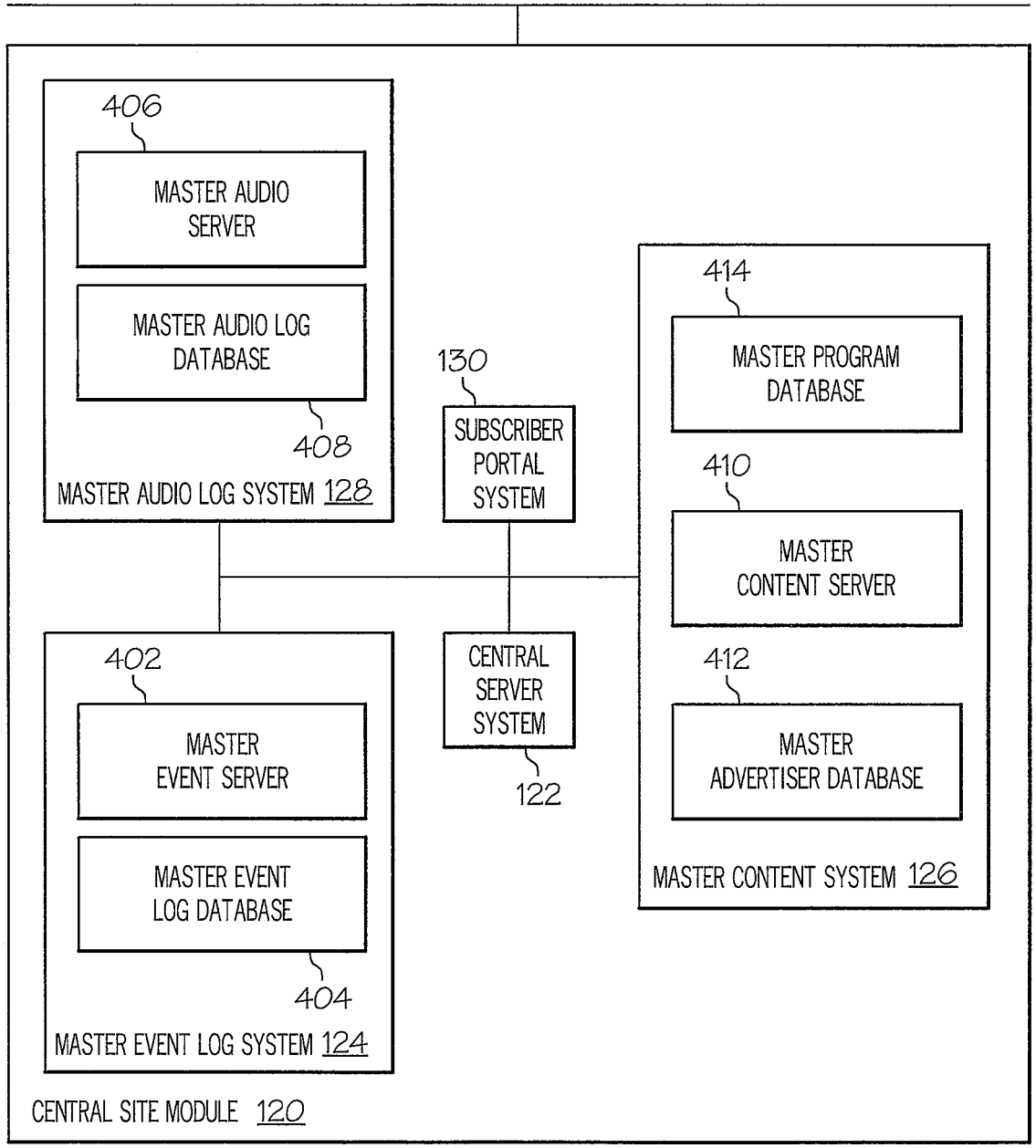
FIG. 4 is a diagram of a central site module of a system for the verification of performance of broadcast advertising events modulated with identifying artifacts in accordance with a representative embodiment of the present disclosure.

FIG. 4 is a diagram of a system 120 for organizing and analyzing identifying artifacts from broadcast radio or television data streams in accordance with an exemplary embodiment of the present invention. System 120 includes central server system 122, master event log system 124, master content system 126, master audio log system 128, and subscriber portal system 130, each of which can be implemented in hardware, software, or a suitable combination of hardware and software, and which can be one or more software systems operating on a general purpose server platform.

Central site module 120 is coupled with receiver site module 110 by data communications medium 140. Data communications medium 140 can be the Internet, a local area network, a wide area network, the public switched telephone network, a wireless network, fiber-optic network, microwave transmission link, or other suitable communications media, or a suitable combination of such communications media.

Master event log system 124 is comprised of master event server 402 with its associated master event log database 404. Master audio log system 128 is comprised of master audio server 406 with its associated master audio log database 408. Master content system 126 comprises master content server 410, master advertiser database 412, and master program database 414.

Periodically, in an illustrated embodiment of the present disclosure, site controller system 112 on command from central server system 122 requests a copy of the data records in the site event log database 318 to be transmitted through data communications medium 140 to master event log system 124 to update master event log database 404. Similarly, the central server system 122 requests a copy of the receiver site's audio log database 314 to be transmitted through data communications medium 140 to master audio log system 128 to update master audio log database 408.

Master reference information is maintained by master content system 126 at the central site. Master program database 414 contains program profiles and unique program identifiers for all program events stored as digital audio or composite audio and video files in any broadcast site broadcast production system 104. Master advertiser database 412 contains reference information on advertisers, commercial profiles and their associated, unique, commercial identifiers for all spot digital audio or composite audio and video files in any broadcast site broadcast production system 104.

Subscriber portal system 130 enables radio and television stations, advertisers, and associated support entities access to the verified performance information collected to the central site module 120 from receiver site module 110. This access is made through data communication medium 140.

Figure 5:
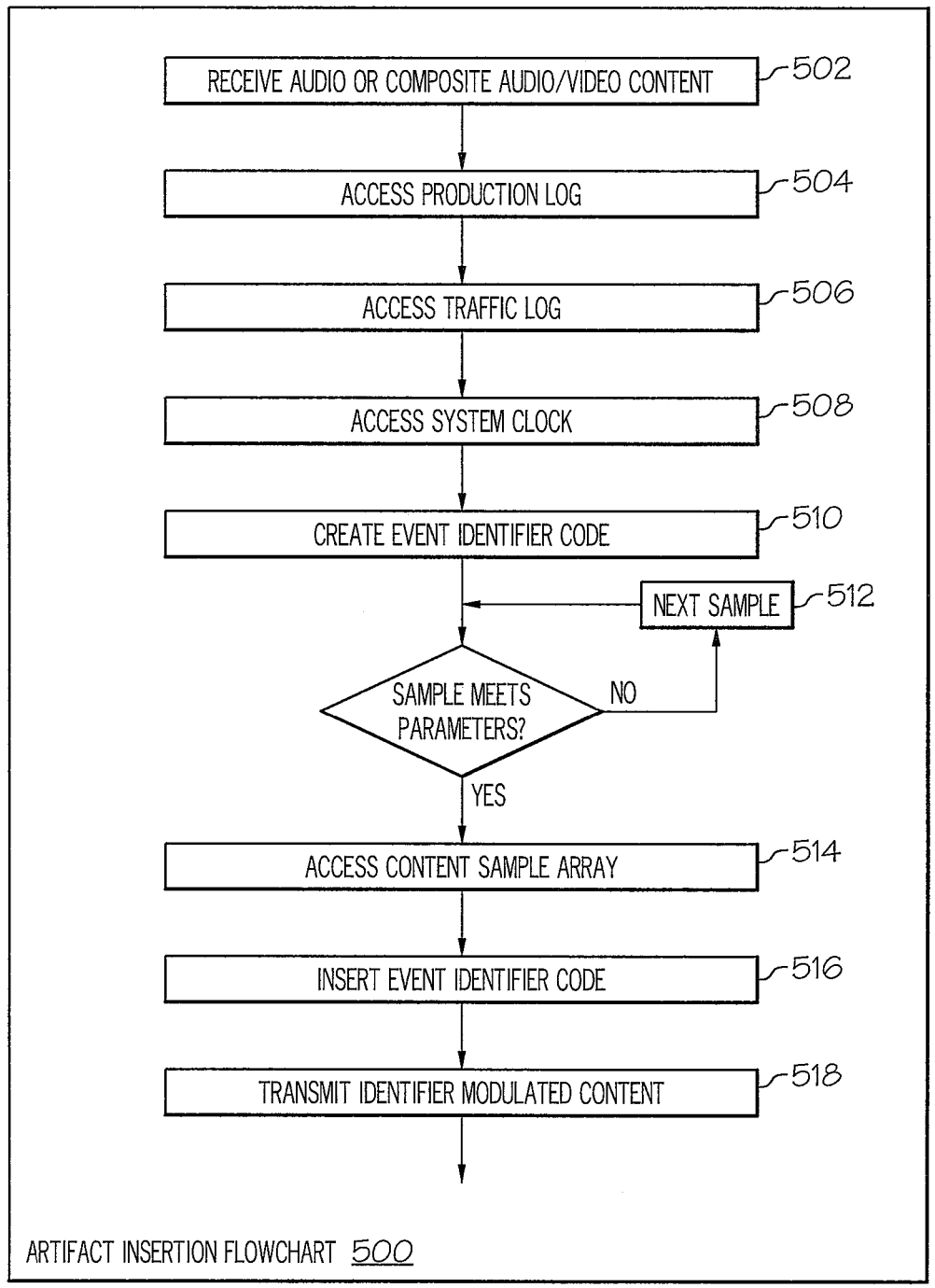
FIG. 5 is a flowchart for a method of artifact insertion in a system for the verification of performance of broadcast advertising events modulated with identifying artifacts in accordance with a representative embodiment of the present disclosure.

FIG. 5 is a flowchart of a method 500 for inserting identifying artifacts into broadcast audio or composite video and audio data streams in accordance with a representative embodiment of the present disclosure. Method 500 begins at 502 where the broadcast data stream is received from broadcast production server 208 once the commercial identifier from the spot's digital audio file and broadcast accounting system 102 event log's instruction record match, the spot's digital audio file is verified and released for broadcast. The method then proceeds to 504.

At 504, the unique identifier for the commercial is retrieved from the event log of broadcast content database 210. The method then proceeds to 506.

At 506, the unique identifier from the event log is compared with the commercial identifier stored in the Insertion Order segment of broadcast accounting database 206. A successful match results and the method proceeds to 508.

At 508, a date and time stamp is received from the computer server's system clock or any other consistently accurate time keeping device. The method then proceeds to 510.

At 510, the method associates the commercial identifier from the broadcast accounting database 206 and the production event identifier with a unique event digital artifact root of appropriate bit length and concatenates this with a time code of appropriate length that denotes the time of insertion of the digital artifact. The method then proceeds to 512.

At 512, samples of the broadcast content are scanned within the artifact translation system 216 for suitability for artifact modulation. Once a sample meets the insertion parameters it and its successors are inserted into data stream content array 212. The method then proceeds to 514.

At 514, the data stream content array is accessed in sequence and the method then proceeds to 516.

At 516, the elements of the identifier artifact are inserted into the broadcast audio or composite video and audio data stream. The method then proceeds to 518.

At 518, the data stream containing modulated artifacts is forwarded to broadcast transmitter system 108 for broadcast.

In operation, method 500 generates an identifying artifact modulated data sequence by verifying that the commercial content to be broadcast matches the instructions from the Insertion Order and combines the unique identifier for the commercial with a station, date and time codes to create an identifying artifact. Method 500 permits the unique identification of broadcast events.

Figure 6:
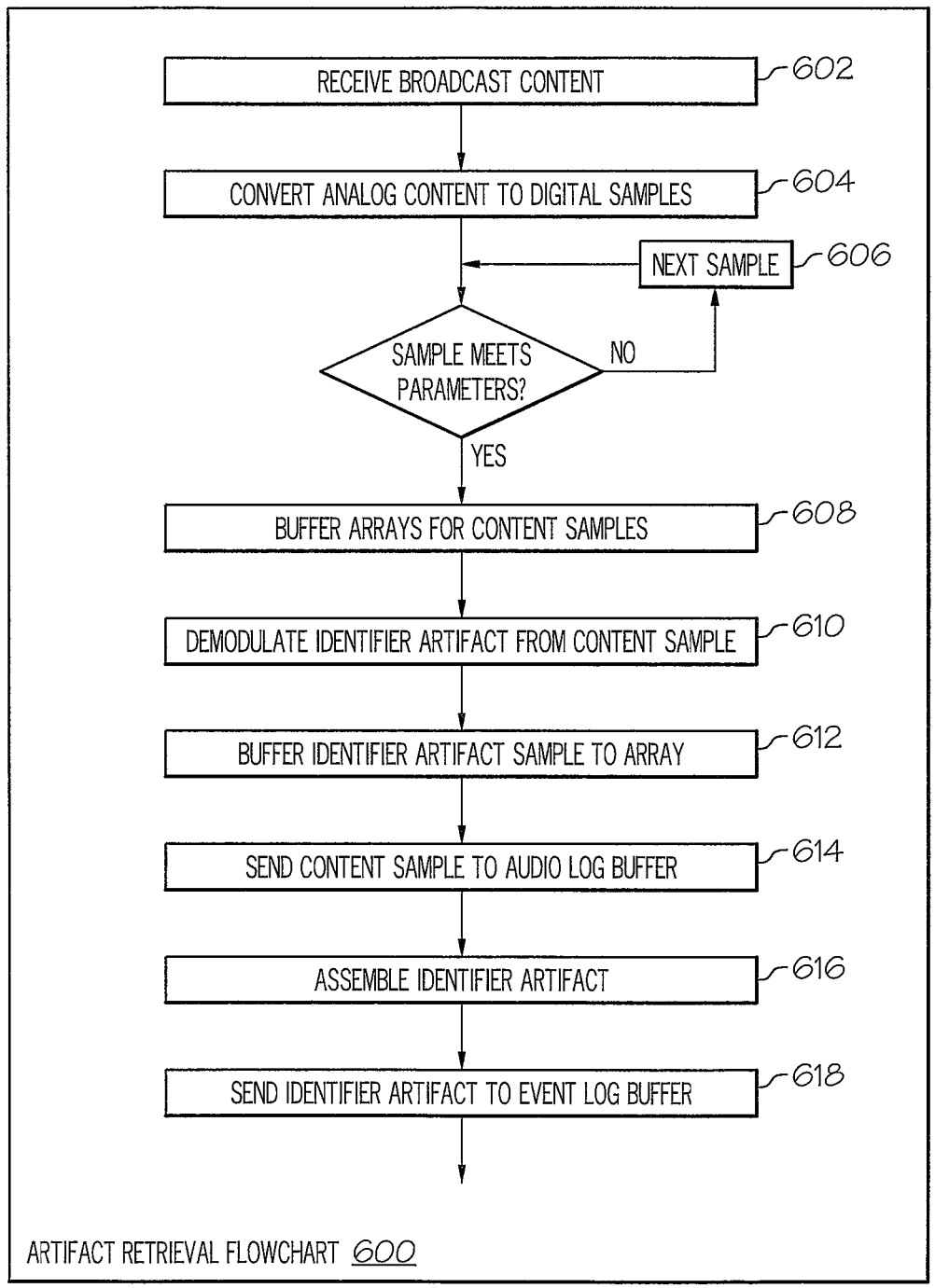
FIG. 6 is a flowchart for a method of artifact retrieval in a system for the verification of performance of broadcast advertising events modulated with identifying artifacts in accordance with a representative embodiment of the present disclosure.

FIG. 6 is a flowchart of a method 600 for retrieving identifying artifacts from broadcast audio or composite video and audio data streams in accordance with a representative embodiment of the present disclosure. Method 600 begins at 602 where the broadcast data stream is received from broadcast transmitter system 108 by a suitable radio frequency receiver in broadcast receiver system 118 tuned to the frequency of broadcast transmitter system 108. The method then proceeds to 604.

At 604, the output signal from broadcast receiver 302 is tested to determine if the signal is analog or comprised of digital samples. If the signal is determined to be analog, it is converted into a digital sample stream through the use of an analog-to-digital converter (ADC). The method then proceeds to 606.

At 606, samples are scanned within the artifact translation system 308 for the presence of a modulated artifact. The method then proceeds to 608.

At 608, the first sample meeting the location parameters and its successors are inserted into modulated content array 306. The method then proceeds to 610.

At 610, artifact translation system demodulates the artifact from the digital content stream. The method then proceeds to 612.

At 612, the elements of the identifying artifacts are inserted into demodulated artifact array 310. The method then proceeds to 614.

At 614, the contents of the modulated content array 306 are sent to the audio log buffer, and the method then proceeds to 616.

At 616, demodulated artifact array 310 is accessed and the identifying artifact is assembled. The method then proceeds to 618.

At 618, the assembled identifying artifact is forwarded to site logging system 114 for processing and insertion in event log database 318.

In operation, method 600 retrieves an identifying artifact from the modulated data sequence and distributes the demodulated elements for archiving or subsequent analysis and storage. Method 600 permits the verification of performance of commercial broadcast advertising events.

Figure 7:
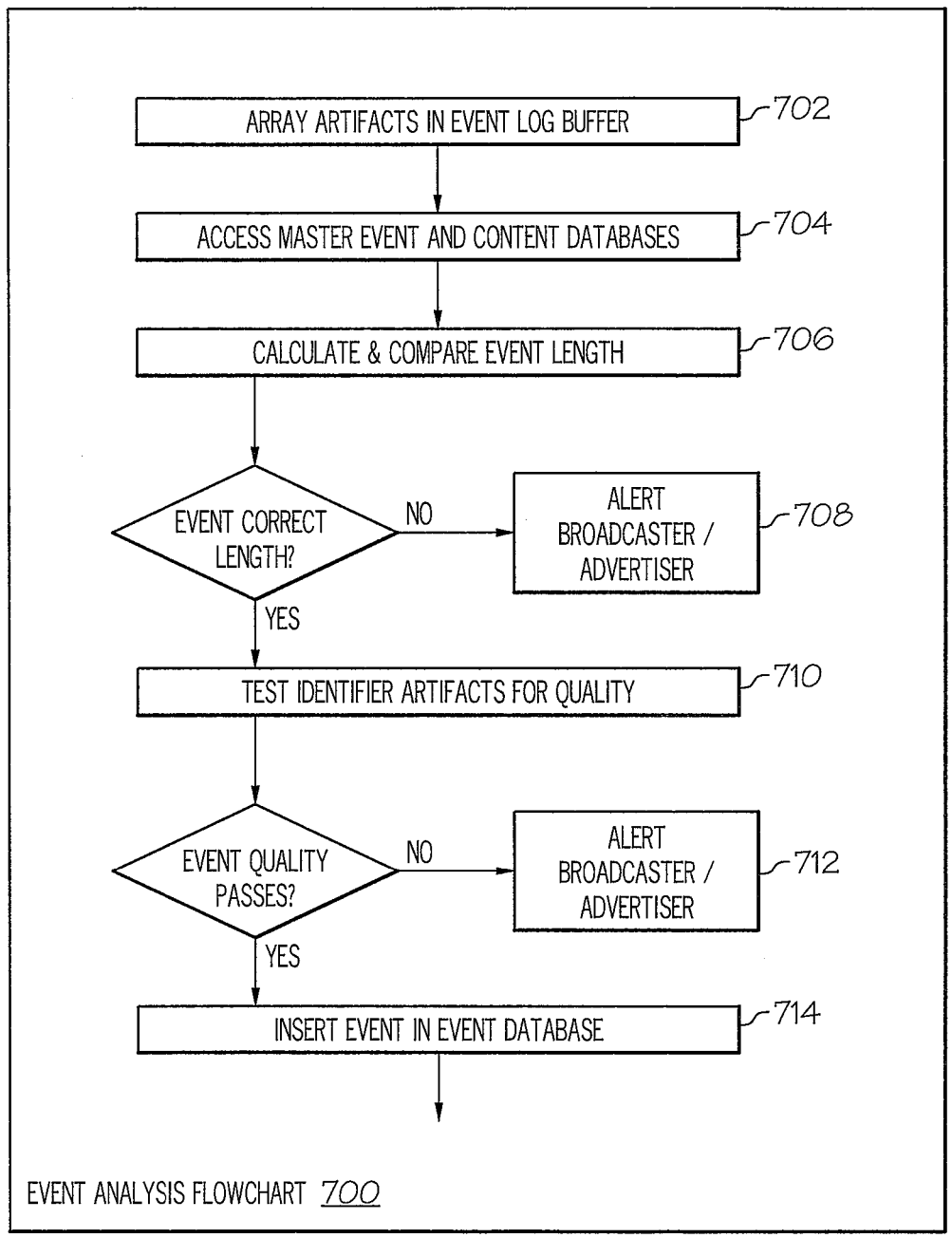
FIG. 7 is a flowchart for a method of event analysis in a system for the verification of performance of broadcast advertising events modulated with identifying artifacts in accordance with a representative embodiment of the present disclosure.

FIG. 7 is a flowchart of a method 700 for the analysis of verified broadcast events in accordance with a representative embodiment of the present disclosure. Method 700 begins at 702 where the identifying artifacts are inserted into an event log array for analysis. The method then proceeds to 704.

At 704, the master event and content databases are accessed to assemble schedule and commercial content to be used as criteria for the event analysis. The method then proceeds to 706.

At 706, the first and last event identifying artifacts with identical unique content identifiers are used to establish the actual length of the event. This length is compared with the content length in the master advertiser database. The method then proceeds to 708.

At 708, if the event length is correct, the method then proceeds to 710. If the event length is not correct the broadcaster and advertiser are notified of the discrepancy. The method then proceeds to 710.

At 710, the identifying artifacts are tested for missing members or garbled structures. The method then proceeds to 712.

At 712, failure to pass a qualitative test results in notification of the advertiser and broadcaster of the discrepancy, and the method proceeds to 714. If the artifacts pass the qualitative test, the method then proceeds to 714.

At 714, the event record is inserted into the event log database.

In operation, method 700 analyzes a set of identifying artifacts from the modulated data sequence for performance accuracy, quality and subsequent archival storage. Method 600 permits the verification of performance of commercial broadcast advertising events.

It will be appreciated by one of ordinary skill in the art that the methods described above may be carried out in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Accordingly, the present disclosure may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

As will be appreciated, the processes in illustrated embodiments of the present disclosure may be implemented using any combination of computer programming software, firmware or hardware. For example, an article of manufacture containing the computer programming code is used by either executing the code directly from the storage device, by copying the code from the storage device into another storage device such as a hard disk, RAM, etc., or by transmitting the code for remote execution. The method form of the disclosure may be practiced by combining software and/or hardware to complete the steps of the disclosure. An apparatus for practicing the disclosure could be one or more computers and storage systems containing or having network access to computer program(s) coded in accordance with the disclosure.

While the disclosure has been particularly shown and described with reference to representative embodiments, it will be understood by those skilled in the art that various changes in form and detail may be made therein without departing from the spirit and scope of the claimed subject matter. Any variations, modifications, additions, and improvements to the embodiments described are possible and may fall within the scope of the disclosure as detailed within the following claims.

What is claimed is:

1. A method comprising:
  retrieving a unique identification code for an advertisement scheduled to be broadcast as identified in an event log;
  combining the unique identification code with broadcast identifying information, including information identifying a broadcasting station broadcasting the advertisement and a date and time of the broadcast of the advertisement by the broadcasting station, wherein the combining creates a unique identifier, wherein the unique identifier uniquely identifies the particular instance of the advertisement being broadcast and distinguishes the particular instance from other instances of the advertisement broadcast at other dates and times or from other stations;

generating a broadcast data stream, wherein the broadcast data stream comprises advertisement content for the advertisement, and wherein generating the broadcast data stream comprises inserting, at the time of a broadcast transmission of the broadcast data stream by a broadcasting station, the unique identifier within the advertisement content within the broadcast data stream; and transmitting the generated broadcast data stream from the broadcasting station identified by the unique identifier, wherein the transmission of the broadcast data stream occurs contemporaneously with the generation of the broadcast data stream.

2. The method according to claim 1, further comprising:
assigning the unique identification code to the advertisement.

3. The method according to claim 1, further comprising:
wherein the advertisement content comprises digital audio data; and
inserting the unique identifier into the digital audio data.

4. The method according to claim 1, further comprising:
wherein the event log indicates a broadcast sequence for broadcasting advertisements and other broadcast content;
extracting the unique identifier within the broadcast data stream when queued for broadcast in accordance with an entry in the event log;
comparing the extracted unique identifier to the unique identification code specified in the entry within the event log; and
releasing the broadcast data stream for transmission from the broadcasting station if the extracted unique identifier is associated with the unique identification code specified in the entry within the event log.

5. The method according to claim 1, further comprising:
revising, at the time of transmitting, the unique identifier within the broadcast data stream with the time of actual broadcast.

6. The method according to claim 1, wherein the broadcast identifying information includes one or more of the broadcasting station, date and time codes.

7. A method comprising:
receiving a broadcast of a broadcast data stream comprising a first advertisement;
extracting a unique identifier from digital content embedded within the first advertisement contained within the received broadcast data stream, wherein the extracted unique identifier identifies a first unique identification code for the first advertisement and broadcast identifying information for the first advertisement, including information identifying a first broadcasting station broadcasting the first advertisement and a date and time of broadcast of the first advertisement by the first broadcasting station, wherein the extracted unique identifier uniquely identifies a particular instance of the first advertisement being broadcast and distinguishes the particular instance from other instances of the first advertisement broadcast at other dates and times or from other stations;
storing the extracted unique identifier in an event log database;
comparing the extracted unique identifier with an authenticated unique identifier referenced in a transmission event log as associated with the first advertisement, wherein the authenticated unique identifier comprises a second unique identification code for a second broadcasting station of a second advertisement and a date and time of broadcast of the second advertisement by the second broadcasting station, and further wherein comparing includes comparing broadcast identifying information for the first advertisement in the extracted unique identifier with broadcast identifying information for the second advertisement in the authenticated unique identifier; and
verifying the broadcast of the broadcast data stream comprising the first advertisement if the extracted unique identifier and authenticated unique identifier match.

8. The method according to claim 7, wherein extracting the unique identifier comprises:
demodulating the unique identifier from the broadcast data stream.

9. The method according to claim 7, further comprising:
receiving the broadcast data stream from a radio frequency receiver.

10. The method according to claim 7, further comprising:
receiving the transmission event log from a transmitting broadcaster, wherein the transmission event log identifies a broadcast event sequence of the broadcast data stream.

11. The method according to claim 7, further comprising:
identifying a first and a last unique identifier of a sequence of unique identifiers within the broadcast data stream having identical unique identifiers; and
determining a length of the broadcast data stream at least between the identified first and last identical unique identifiers.

12. The method according to claim 11, further comprising:
determining that the length indicates the first advertisement corresponding to the unique identifier had been broadcast in the received broadcast data stream.

13. The method according to claim 12, further comprising:
retrieving an event sequence log from a central storage database that had received the event sequence log from a transmitter of a broadcast data stream.

14. A system comprising:
a content control system configured to assign a unique identification code to broadcast data associated with an advertisement, and store the unique identification code in association with the broadcast data, wherein a production log identifies the sequence of broadcast performance for the advertisement and other broadcast content;
a broadcast production system configured to access a broadcast content database and insert broadcast data from the broadcast content database corresponding to an indicated unique identification code, in accordance with the production log, into a broadcast data stream;
a modulation system receiving at least a portion of the broadcast data from the broadcast production system and modulating the at least a portion of the broadcast data periodically with a unique identifier to create modulated broadcast data, wherein the unique identifier comprises the unique identification code and broadcast identifying information, including information identifying a broadcasting station broadcasting the advertisement and a date and time of the broadcast of the advertisement by the broadcasting station, wherein the unique identifier uniquely identifies a particular instance of the advertisement being broadcast and distinguishes the particular instance from other instances of the advertisement broadcast at other dates and times or from other stations; and a transmission system that transmits, contemporaneously with the broadcast data modulation, the broadcast data containing the modulated broadcast data when the unique identifier within the modulated broadcast data is determined to be associated with the unique identification code identified in the production log for the broadcast data and to identify a date and time of the broadcast associated with the sequence of broadcast performance for the advertisement identified in the production log for the broadcast data.

15. The system of claim 14, further comprising a broadcast transmitter system that receives the broadcast data stream from the transmission system, converts the broadcast data stream into radio frequency signals and transmits the radio frequency signals over a communication medium.

16. A system comprising:
means for retrieving a unique identification code for an advertisement scheduled to be broadcast as identified in an event log;
means for combining the unique identification code with broadcast identifying information, including information identifying a broadcasting station broadcasting the advertisement and a date and time of the broadcast of the advertisement by the broadcasting station, wherein the combining creates a unique identifier, wherein the unique identifier uniquely identifies the particular instance of the advertisement being broadcast and distinguishes the instance from other instances of the advertisement broadcast at other dates and times or from other stations;
means for generating a broadcast data stream, wherein the broadcast data stream comprises advertisement content for the advertisement, and wherein generating the broadcast data stream comprises inserting, at the time of a broadcast transmission of the broadcast data stream by the broadcasting station, the unique identifier within the advertisement content within the broadcast data stream; and
means for transmitting the broadcast data stream, wherein the transmission of the broadcast data stream occurs contemporaneously with the generation of the broadcast data stream.

17. The system according to claim 16, wherein the advertisement content comprises digital audio data, and further comprising means for:
inserting the unique identifier into the digital audio data.

18. The system according to claim 16, further comprising means for:
extracting the unique identifier within the advertisement content when queued for broadcast in accordance with an entry in the event log;
comparing the extracted unique identifier to the unique identification code specified in the entry within the event log; and
releasing the advertisement content for transmission from the broadcasting station within the broadcast data stream if the extracted unique identifier is associated with the unique identification code specified in the entry within the event log,
wherein the event log indicates a broadcast sequence for broadcasting advertisements and other broadcast content.

19. The system according to claim 16, further comprising means for:
revising the unique identifier with the time of broadcast.

20. The system according to claim 16, further comprising a receiver system configured to:
receive the broadcast data stream comprising the advertisement;
extract a received unique identifier from digital content contained within the advertisement;
store the extracted received unique identifier in an event log database;
compare the extracted received unique identifier with an authenticated received unique identifier referenced in a transmission event log as associated with the advertisement; and
verify broadcast of the advertisement if the extracted received unique identifier and the authenticated received unique identifier match.

21. The system according to claim 20, wherein extraction of the unique identifier includes:
demodulating the received unique identifier from within the broadcast data stream.

22. The system according to claim 20, further wherein the receiver system comprises means for:
identifying a first and a last unique identifier of a sequence of unique identifiers within the broadcast data stream having identical unique identifiers;
determining a length of the broadcast data stream at least between the identified first and last identical unique identifiers; and
determining that the length indicates the advertisement corresponding to the identical unique identifiers that had been broadcast in the received broadcast data stream.

23. The system according to claim 16, further comprising:
a central storage database that stores an event sequence log extracted from a transmitter event log.

24. A non-transitory computer memory medium having instructions stored thereon that, in response to execution by a computing device, cause the computing device to:
retrieve a unique identification code for an advertisement scheduled to be broadcast as identified in an event log;
combine the unique identification code with broadcast identifying information, including information identifying a broadcasting station broadcasting the advertisement and a date and time of the broadcast of the advertisement by the broadcasting station, wherein the combining creates a unique identifier, wherein the unique identifier uniquely identifies the particular instance of the advertisement being broadcast and distinguishes the particular instance from other instances of the advertisement broadcast at other dates and times or from other stations;
generate a broadcast data stream, wherein the broadcast data stream comprises advertisement content for the advertisement, and wherein generating the broadcast data stream comprises inserting, at the time of a broadcast transmission of the broadcast data stream by a broadcasting station, the unique identifier within the advertisement content within the broadcast data stream; and
transmit the generated broadcast data stream from the broadcasting station identified by the unique identifier, wherein transmission of the generated broadcast data stream occurs contemporaneously with the generation of the broadcast data stream.

25. A non-transitory computer memory medium having instructions stored thereon that, in response to execution by a computing device, cause the computing device to:
receive a broadcast data stream comprising an advertisement;

extract a unique identifier from digital content embedded within the advertisement contained within the received broadcast data stream, wherein the extracted unique identifier identifies a first unique identification code for the first advertisement and broadcast identifying information for the first advertisement, including information identifying a first broadcasting station broadcasting the first advertisement and a date and time of broadcast of the first advertisement by the first broadcasting station, wherein the extracted unique identifier uniquely identifies a particular instance of the first advertisement being broadcast and distinguishes the particular instance from other instances of the first advertisement broadcast at other dates and times or from other stations;

store the extracted unique identifier in an event log database;

compare the extracted unique identifier with an authenticated unique identifier referenced in a transmission event log as associated with the first advertisement, wherein the authenticated unique identifier comprises a second unique identification code for a second broadcasting station of a second advertisement and a date and time of broadcast of the second advertisement by the second broadcasting station, and further wherein comparing includes comparing broadcast identifying information for the first advertisement in the extracted unique identifier with broadcast identifying information for the second advertisement in the authenticated unique identifier; and verify broadcast of the first advertisement if the extracted unique identifier and authenticated unique identifier match.

26. The method according to claim 7, further comprising:
analyzing the extracted unique identifier for transmission accuracy.

27. The method according to claim 26, further comprising:
notifying the first broadcasting station of transmission inaccuracy.

28. The method according to claim 26, wherein analyzing the extracted unique identifier for transmission accuracy includes identifying any missing members from the extracted unique identifier.

29. The method according to claim 26, wherein analyzing the extracted unique identifier for transmission accuracy includes identifying any distorted structures of the extracted unique identifier.

30. The system according to claim 20, further comprising means for:
analyzing the extracted unique identifier for any missing members from the extracted unique identifier;
analyzing the extracted unique identifier for any distorted structures of the extracted unique identifier; and
notifying the first broadcasting station of transmission inaccuracy.

* * * * *

UNITED STATES PATENT AND TRADEMARK OFFICE
CERTIFICATE OF CORRECTION

PATENT NO. : 8,566,857 B2  Page 1 of 1
APPLICATION NO. : 11/533748
DATED : October 22, 2013
INVENTOR(S) : Putnam It is certified that error appears in the above-identified patent and that said Letters Patent is hereby corrected as shown below:

In the Specification

In Column 6, Line 10, delete "broadcast" and insert -- Broadcast --, therefor.

In Column 6, Lines 42-43, delete "artifact translation system 210," and insert -- artifact translation system 216, --, therefor.

In Column 6, Lines 50-51, delete "artifact translation system 210" and insert -- artifact translation system 216 --, therefor.

Signed and Sealed this
Twenty-fourth Day of June, 2014

Michelle K. Lee
*Deputy Director of the United States Patent and Trademark Office*